(12) United States Patent
Wang et al.

(10) Patent No.: US 11,207,870 B2
(45) Date of Patent: Dec. 28, 2021

(54) REFRACTIVE-INDEX MATCHING OPTICAL WINDOW

(71) Applicants: Ruibo Wang, Oak Park, CA (US); Pawel Adam Menzfeld, Thousand Oaks, CA (US); James Frederick Gass, Camarillo, CA (US)

(72) Inventors: Ruibo Wang, Oak Park, CA (US); Pawel Adam Menzfeld, Thousand Oaks, CA (US); James Frederick Gass, Camarillo, CA (US)

(73) Assignee: OAK ANALYTICS INC, Camarillo, CA (US)

( * ) Notice: Subject to any disclaimer, the term of this patent is extended or adjusted under 35 U.S.C. 154(b) by 188 days.

(21) Appl. No.: 16/043,170

(22) Filed: Jul. 24, 2018

(65) Prior Publication Data

US 2019/0025119 A1 Jan. 24, 2019

Related U.S. Application Data

(60) Provisional application No. 62/536,091, filed on Jul. 24, 2017.

(51) Int. Cl.
| | | |
|---|---|---|
| *G02B 5/00* | (2006.01) | |
| *B32B 27/08* | (2006.01) | |
| *G01J 3/02* | (2006.01) | |
| *B32B 17/10* | (2006.01) | |

(52) U.S. Cl.
CPC .............. *B32B 27/08* (2013.01); *B32B 17/10* (2013.01); *G01J 3/0205* (2013.01); *B32B 2307/418* (2013.01); *B32B 2307/546* (2013.01); *B32B 2551/00* (2013.01)

(58) Field of Classification Search
CPC .... G01J 3/00; G01J 3/02; G01J 3/0202; G01J 3/0205; G01J 3/0262; B32B 17/00; B32B 17/06; B32B 17/064; B32B 17/10; B32B 17/08; B32B 27/00; B32B 27/06; B32B 27/08; B32B 2307/00; B32B 2307/40; B32B 2307/418; B32B 2307/546; B32B 2307/50; B32B 2307/51; B32B 2551/00; B32B 2266/12; B32B 2266/14; C03C 17/00
USPC ....................................................... 359/894
See application file for complete search history.

(56) References Cited

U.S. PATENT DOCUMENTS

| | | | | |
|---|---|---|---|---|
| 6,081,331 A | * | 6/2000 | Teichmann | G01J 3/02 356/328 |
| 2006/0268269 A1 | * | 11/2006 | Warren | G01J 3/0259 356/328 |
| 2009/0310135 A1 | * | 12/2009 | Bockstaele | G01J 3/02 356/328 |

(Continued)

*Primary Examiner* — Stephone B Allen
*Assistant Examiner* — Jyotsna V Dabbi

(57) ABSTRACT

An optical window for an imaging system such as a Raman spectrometer, NIR spectrometer, fluorometer, or hyperspectral camera is configured to contact the subject. It includes: a substrate; and a flexible medium, where the flexible medium is configured to be deformed with substantially the same profile as that of the outer surface of the subject. The refractive index of the flexible medium and substrate is selected such that light collection efficiency and/or imaging quality returned to the measurement system increases after application of the optical window.

20 Claims, 4 Drawing Sheets

(56) References Cited

U.S. PATENT DOCUMENTS

2015/0123911 A1* 5/2015 Poliakov ................. G06F 3/041
                                                    345/173
2016/0298005 A1* 10/2016 Sherman .................... C09J 4/06
2016/0325532 A1* 11/2016 Pudleiner ............ H01L 51/0097
2016/0362583 A1* 12/2016 Naik ..................... B65C 9/0006

* cited by examiner

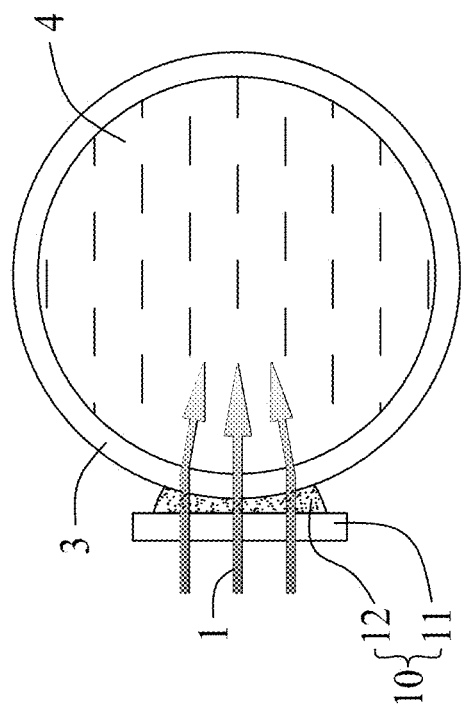
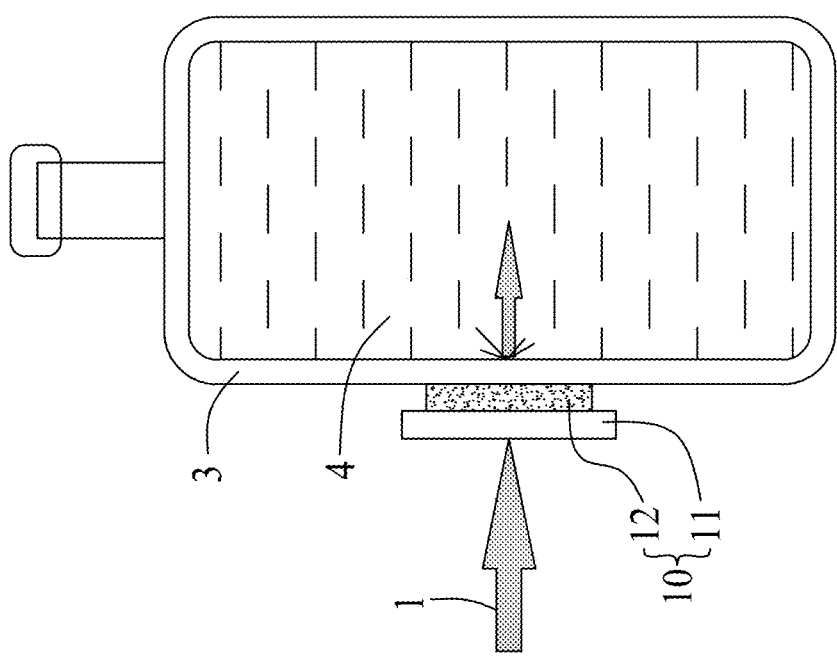
Fig. 3B
Fig. 3A

REFRACTIVE-INDEX MATCHING OPTICAL WINDOW

PRIORITY CLAIM

This application claims priority benefits from U.S. provisional application No. 62/536,091, filed on Jul. 24, 2017 and entitled "REFRACTIVE INDEX MATCHING OPTICAL WINDOW". The present application incorporates the foregoing disclosures herein by reference.

BACKGROUND OF THE DISCLOSURE

Field of the Disclosure

The present application relates to an optical window, and more particularly to an optical window provided with a flexible matching medium between two materials to reduce scattering and refraction of light beams passing from one of the materials to the other.

Brief Description of the Related Art

When light is used to test a sample in a transparent container, the surface roughness and surface curvature of the container can largely change the direction of light propagation. It may lower light collection efficiency or introduce an image distortion.

If a light beam is incident onto an interface, propagation of the light will follow the Snell's law, i.e., $$n1*\sin(a) = n2*\sin(b)$$

where n1 and n2 are the refractive indices of the media, a and b are the angle of incidence and angle of refraction (respectively) as seen in FIGS. 1A and 1B. FIG. 1A shows light paths passing through two materials with different refractive indices, wherein n2 is greater than n1. There will be a similarly destructive affect if n2 is less than n1. FIG. 1B shows light paths passing through two materials with the seme refractive index. Referring to FIG. 1B, one can see that when n1 equals n2, the direction of light propagation is unchanged.

SUMMARY OF THE DISCLOSURE

One aspect of the disclosure provides an optical window for a Raman spectrometer, flurometer, hyperspectral camera, NIR spectrometer or other optical measurement system configured to pass light from a subject to the measurement device with increased performance, wherein the optical window comprises the subject, a flexible medium, and substrate. The flexible medium is configured to be deformed with substantially the same profile as that of the outer surface of the subject, wherein the substrate and flexible medium are configured to allow light to pass from the subject to the measurement system through the optical window with a refractive index of a useful range such as 1.35 to 1.6.

Another aspect of the disclosure provides an optical window configured such that the ratio of refractive index of the flexible medium, substrate, and subject are 0.75 to 1.25.

Another aspect of the disclosure provides an optical window is comprised of a flexible medium and substrate to create index matching between a subject and the optical measurement system. The refractive index of the flexible medium is such that light collection efficiency or imaging quality returned to a measurement system increases after application of the optical window. The refractive index of the substrate is such that light collection efficiency or imaging quality returned to a measurement system increases after application of the optical window. The flexible medium is a material such that it can be deformed to have substantially the same surface profile as the subject. The flexible medium is between the subject and the substrate. The subject and flexible medium are in physical contact with each other. The flexible medium and substrate are in physical contact with each other. The refractive index ratio between the subject and the flexible medium is within a useful range, 0.75 to 1.25. The refractive index ratio between the flexible medium and the substrate is within a useful range, 0.75 to 1.25. The color of the flexible medium is chosen to filter any undesired light spectrum such that light collection efficiency or imaging quality returned to a measurement system increases after application of the optical window. The color of the substrate is chosen to filter any undesired light spectrum such that light collection efficiency or imaging quality returned to a measurement system increases after application of the optical window. The optical window can be removed from the subject and reused.

These, as well as other components, steps, features, benefits, and advantages of the present application, will now become clear from a review of the following detailed description of illustrative embodiments, the accompanying drawings, and the claims.

BRIEF DESCRIPTION OF THE DRAWINGS

The drawings disclose illustrative embodiments of the present application. They do not set forth all embodiments. Other embodiments may be used in addition to or instead of described embodiments. Details that may be apparent or unnecessary may be omitted to save space or for more effective illustration. Conversely, some embodiments may be practiced without all of the details that are disclosed. When the same reference number or reference indicator appears in different drawings, it may refer to the same or like components or steps.

Aspects of the disclosure may be more fully understood from the following description when read together with the accompanying drawings, which are to be regarded as illustrative in nature, and not as limiting. The drawings are not necessarily to scale, emphasis instead being placed on the principles of the disclosure. In the drawings:

FIG. 3A is a side view of an optical window contacting an outer surface of a container in accordance with the present application.

FIG. 3B is a top view of an optical window contacting an outer surface of a container in accordance with the present application.

Figure 1B:
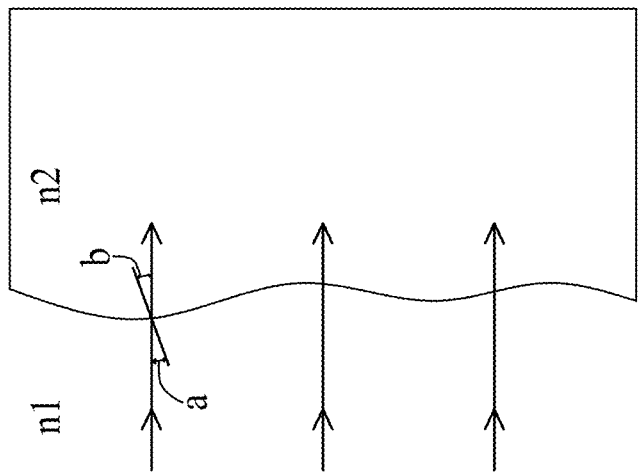
FIG. 1B shows light paths passing through two materials with the seme refractive index.
Figure 1A:
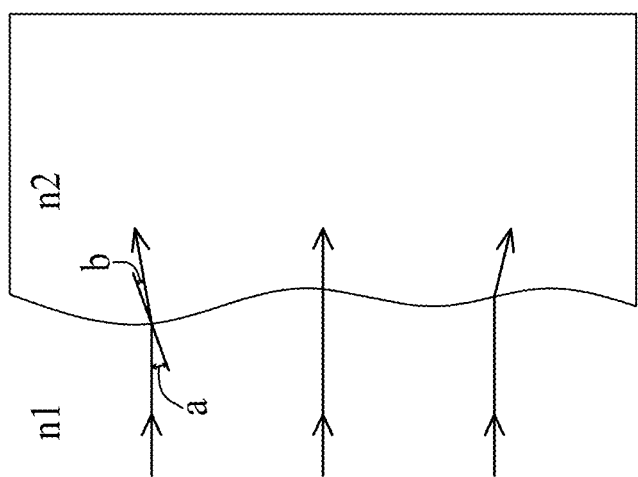
FIG. 1A shows light paths passing through two materials with different refractive indices, wherein n2 is greater than n1.

While certain embodiments are depicted in the drawings, one skilled in the art will appreciate that the embodiments depicted are illustrative and that variations of those shown, as well as other embodiments described herein, may be envisioned and practiced within the scope of the present application.

DETAILED DESCRIPTION OF THE DISCLOSURE

Illustrative embodiments are now described. Other embodiments may be used in addition to or instead of described embodiments. Details that may be apparent or unnecessary may be omitted to save space or for a more effective presentation. Conversely, some embodiments may be practiced without all of the details that are disclosed.

Figure 2B:
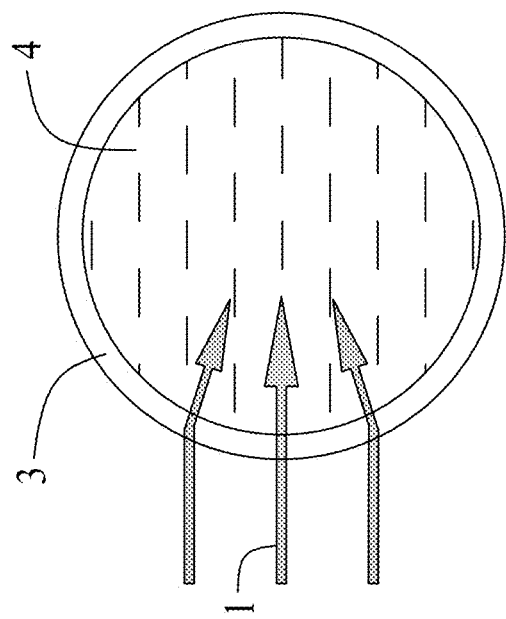
FIG. 2B is a top view of a laser beam passing through a container.
Figure 2A:
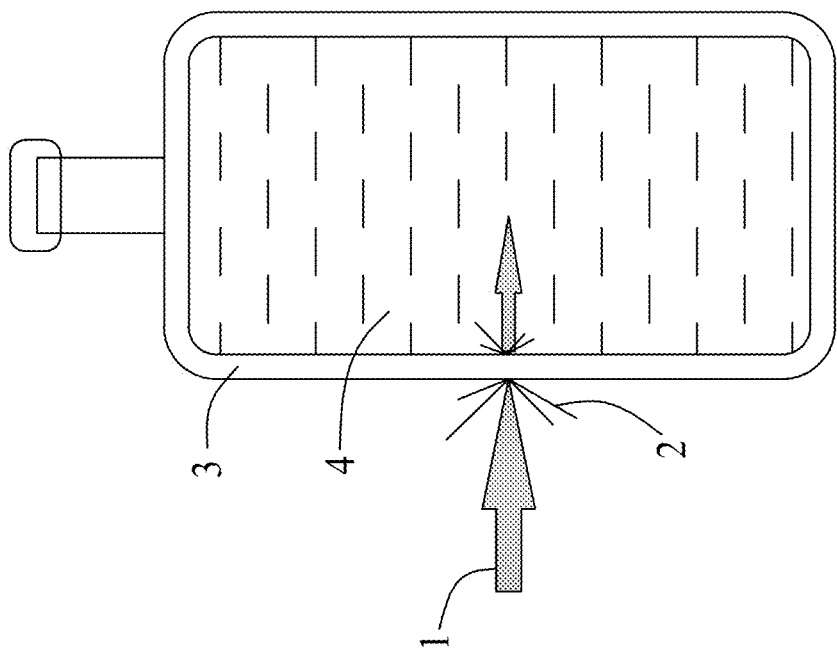
FIG. 2A is a side view of a laser beam passing through a container.

In an optical measurement system such as Raman spectrometer, flurometer, hyperspectral camera, or NIR spectrometer a light source such as a laser beam (1) is employed as the excitation light source to measure a subject. For Example: when the light source (1) is transmitted through the wall of a container (3), scattering (2) may take place at the outer and inner surfaces of the container (3) due to the roughness of the surface of the container (3). Furthermore, if the container's surface is not flat, refraction also takes place at the interface between the air and the container (3) and the interface of the container (3) and liquid (4), such as wine or oil, in the container (3), as shown in FIGS. 2A and 2B. FIG. 2A is a side view of a laser beam passing through a container. FIG. 2B is a top view of a laser beam passing through a container.

Figure 3C:
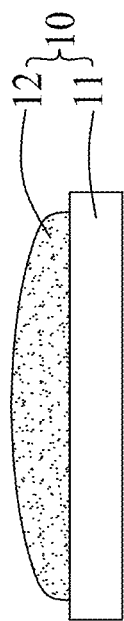
FIG. 3C is a side view of an optical window in accordance with the present application.

Here light scattering is the result of the local surface non-uniformity. Refraction is the result of macro surface curvature. In order to resolve the above problems, the present application provides an optical window as seen in FIGS. 3A, 3B and 3C to reduce the light scattering or refraction from the surface of the container (3). FIG. 3A is a side view of an optical window contacting an outer surface of a container in accordance with the present application. FIG. 3B is a top view of an optical window contacting an outer surface of a container in accordance with the present application. FIG. 3C is a side view of an optical window in accordance with the present application. Referring to FIG. 3C, an optical window (10) may be provided with a substrate (11), made of glass or plastic, having a top surface and a bottom surface opposite and parallel to each other. The optical window (10) may further include a flexible medium (12), such as a gel, resin, polymer, wax, rubber, or other, placed on the top surface of the substrate (11), wherein the flexible medium (12) in an original state may have a convex curvature at a top side thereof and have a thickness between 2 and 4 mm from the topmost point thereof to the top surface of the substrate (11). When the optical widow (10) is mounted to the container (3), the flexible medium (12) may be deformed with the profile of the container (3) such that the flexible medium (12) may have a central portion to be forced to move outward from center as seen in FIGS. 3A and 3B.

For example, referring to FIGS. 3A, 3B and 3C, the flexible medium (12) may have (substantially) the same refractive index as that of the container (3). The ratio value of the refractive index of the flexible medium (12) to the refractive index of the container (3) may be between 0.75 and 1.25. The flexible medium (12) may have (substantially) the same refractive index as that of the substrate (11). The ratio value of the refractive index of the flexible medium (12) to the refractive index of the substrate (11) may be between 0.75 and 1.25. In the case that the container (3) is made of glass typically with a refractive index between 1.6 and 1.4, the flexible medium (12) may be made of gel with a refractive index between 1.6 and 1.4 and the substrate (11) may be made of glass or plastic with a refractive index between 1.6 and 1.4. In the case that the container (3) is made of plastic typically with a refractive index between 1.6 and 1.35, the flexible medium (12) may be made of gel with a refractive index between 1.6 and 1.35 and the substrate (11) may be made of glass or plastic with a refractive index between 1.6 and 1.35. Because the flexible medium (12) mechanically matches the outer surface of the container (3) with its refractive index optically matching that of the container (3), no scattering between the flexible medium (12) and the outer surface of the container (3) may take place and no refraction from the outer surface of the the container (3) may take place.

Besides, referring to FIGS. 3A, 3B and 3C, the optical window (10) may be detached from the container (3) for reuse. After being detached from the container (3), the flexible medium (12) may be restored to its original state as seen in FIG. 3C.

Figure 4:
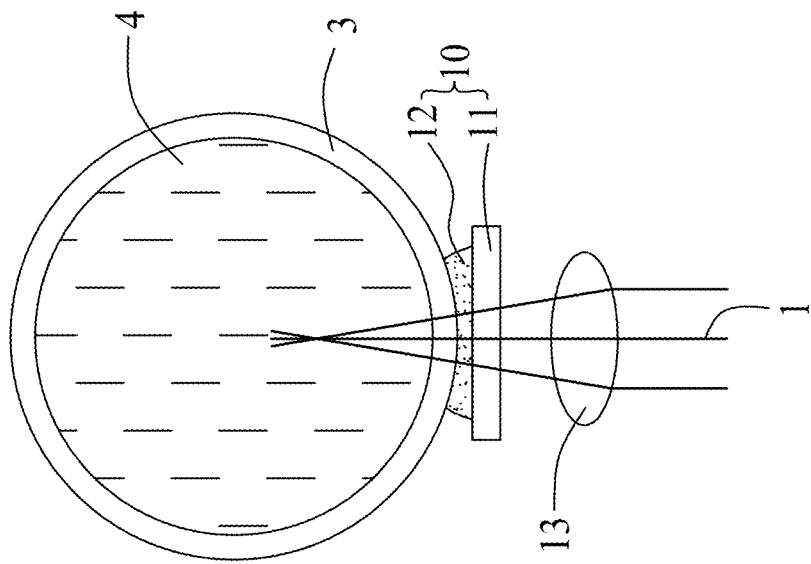
FIG. 4 is a top view of an optical window contacting an outer surface of a container in accordance with the present application.

FIG. 4 is a top view of an optical window contacting an outer surface of a container in accordance with the present application. Referring to FIG. 4, the optical widow (10) may be assembled with an optical lens (13), i.e., focusing lens, for forming a focus beam (14) to be focused at the liquid (4) in the container (3). The focusing lens (13) is set in an optical path of the light source (1) of the imaging system to the optical window (10). The optical widow (10) as illustrated in FIG. 4 may have the same specifications or features as that illustrated in FIGS. 3A, 3B and 3C.

The components, steps, features, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. Furthermore, unless stated otherwise, the numerical ranges provided are intended to be inclusive of the stated lower and upper values. Moreover, unless stated otherwise, all material selections and numerical values are representative of preferred embodiments and other ranges and/or materials may be used.

The scope of protection is limited solely by the claims, and such scope is intended and should be interpreted to be as broad as is consistent with the ordinary meaning of the language that is used in the claims when interpreted in light of this specification and the prosecution history that follows, and to encompass all structural and functional equivalents thereof.

What is claimed is:

1. An optical window for coupling light from an optical measuring device to a substance under test, the substance external to the optical measuring device, the optical window comprising:

a substrate facing the optical measuring device; and a flexible medium coupled to the substrate, wherein the flexible medium is configured to removably couple to an outer surface of the substance, the flexible medium to macroscopically deform and form a profile that substantially conforms to a profile of an outer surface of the substance to allow light to travel between the optical measuring device and the substance through the substrate and flexible medium, wherein a ratio value of a refractive index of the flexible medium to a refractive index of the substance is configured to be between 0.9 and 1.1.

2. The optical window of claim 1, wherein the optical measuring device is a spectrometer.

3. The optical window of claim 1, wherein the optical spectrometer is a hyperspectral imaging device.

4. The optical window of claim 1, wherein the optical spectrometer is a fluorometer.

5. The optical window of claim 1, wherein the substrate includes a planar surface facing the optical measuring device.

6. The optical window of claim 1, wherein the light includes light produced by an excitation source in the optical measuring device.

7. The optical window of claim 1, wherein the light includes light that serves as a return signal from the substance under test, such return signal to be used by the optical measuring device to analyze the substance under test.

8. The optical window of claim 1 wherein the flexible medium comprises a gel.

9. The optical window of claim 8 wherein the flexible medium has a refractive index between 1.35 and 1.6.

10. The optical window of claim 1, wherein the optical measuring device is a Raman spectrometer.

11. An optical window for coupling light from an optical measuring device to a container containing a subject under test, the container external to the optical measuring device, the optical window comprising:

a substrate facing the optical measuring device; and
a flexible medium coupled to the substrate, wherein the flexible medium is configured to removably couple to an outer surface of the container, the flexible medium to macroscopically deform and form a profile that substantially conforms to a profile of an outer surface of the container to allow light to travel between the optical measuring device and the container through the substrate and flexible medium, wherein a ratio value of a refractive index of the flexible medium to a refractive index of the container is configured to be between 0.9 and 1.1.

12. The optical window of claim 11, wherein the optical measuring device is a spectrometer.

13. The optical window of claim 11, wherein the optical spectrometer is a hyperspectral imaging device.

14. The optical window of claim 11, wherein the optical spectrometer is a fluorometer.

15. The optical window of claim 11, wherein the substrate includes a planar surface facing the optical measuring device.

16. The optical window of claim 11, wherein the light includes light produced by an excitation source in the optical measuring device.

17. The optical window of claim 11, wherein the light includes light that serves as a return signal from the subject under test, such return signal to be used by the optical measuring device to analyze the subject under test.

18. The optical window of claim 11 wherein the flexible medium comprises a gel.

19. The optical window of claim 18 wherein the flexible medium has a refractive index between 1.35 and 1.6.

20. The optical window of claim 11, wherein the optical measuring device is a Raman spectrometer.

* * * * *